June 23, 1942.  V. S. WALKER ET AL  2,287,333
VALVE
Filed Oct. 24, 1940    3 Sheets-Sheet 1

Inventor
Vernon S. Walker
Loyal R. Babb
By Clarence A. O'Brien
Attorney

June 23, 1942.  V. S. WALKER ET AL  2,287,333
VALVE
Filed Oct. 24, 1940   3 Sheets-Sheet 2

Inventor
Vernon S. Walker
Loyal R. Babb

By Clarence A. O'Brien

Attorney

Inventor
Vernon S. Walker
Loyal R. Babb

By Clarence A. O'Brien

Attorney

Patented June 23, 1942

2,287,333

UNITED STATES PATENT OFFICE 2,287,333

VALVE

Vernon S. Walker and Loyal R. Babb, Tulsa, Okla.

Application October 24, 1940, Serial No. 362,678

1 Claim. (Cl. 251—113)

The present invention relates to new and useful improvements in valves particularly of the rotary plug type and has for its primary object to provide, in a manner as hereinafter set forth, a device of this character embodying a novel construction and arrangement whereby the parts which are subjected to wear or damage may be expeditiously replaced without the necessity of taking the valve or the pipe line in which it is interposed out of service.

Another very important object of the invention is to provide a valve of the aforementioned character wherein the plug and seat are in the form of a removable unit.

Other objects of the invention are to provide a valve of the character described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein.

Figure 2:
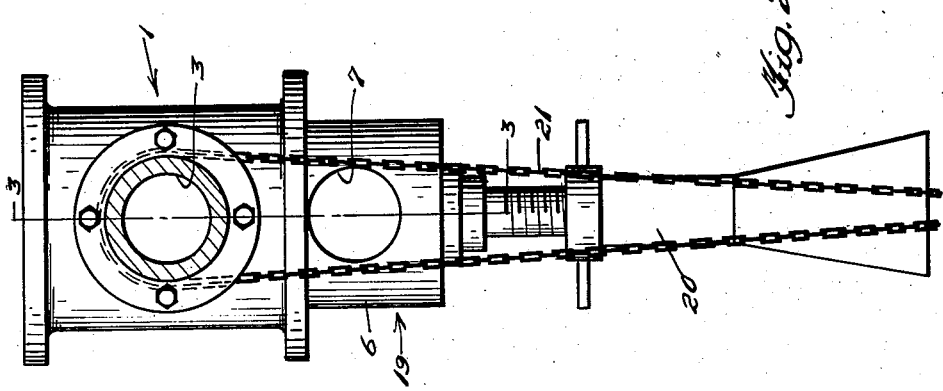
Figure 2 is an elevational view, taken at right angles to Figure 1, the pipe line being shown in cross section.

Referring now to the drawings in detail, it will be seen that the reference numeral 1 designates a body of suitable metal and including flanged ends 2 which are bolted or otherwise secured to the pipe line 3. The body 1 has formed therein a cylinder 4 which is open at both ends and of uniform diameter throughout.

The cylinder 4 is for the reception of a removable valve unit which is designated generally by the reference numeral 5. The unit 5 includes an internally tapered liner or seat 6 of suitable metal which is adapted to be inserted in or removed from the cylinder 4 from either end thereof. The seat 6 is provided with diametrically opposite ports 7 which are aligned with the inlet and outlet ends of the body 1. Keys 8 positively secure the seat 6 against rotation and in proper position in the body 1.

The removable unit 5 further includes a tapered plug 9 which is rotatably and removably mounted in the seat 6. The plug 9 includes a diametrically extending passage 10 for registery with the ports 7. A retaining ring 11 for the plug 9 is secured on one end of the seat 6 by stud bolts 12. Interposed between the retaining ring 11 and the plug 9 is a ball thrust bearing 13. Adjusting screws 14 are provided in the retaining ring 11 for the thrust bearing 13. The large end portion of the plug 9 is recessed at 26 to accommodate the bearing 13 and the retaining ring 11.

The removable unit 5 is secured against vertical movement in the cylinder 4 by closure plates 15 which are bolted on the ends of said cylinder. One of the plates 15 has formed thereon an annular flange 16 which projects into one end portion of the cylinder 4 to a point closely adjacent the retaining ring 11 of the unit 5. Extending rotatably through the other plate 15 is a stem 17 for rotating the plug 9 of the unit 5. This plate 15 is provided with a suitable packing 18 for the stem 17. The ends of the plug 9 are provided with grooves 23 having enlarged intermediate portions 24. Mounted on the inner end portion of the stem 17 is a key or crosshead 25. The key 25 is engageable selectively in the grooves 23, the enlarged portions 24 thereof accommodating the inner end portion of the stem 17. Thus, the stem 17 may be mounted on either end of the cylinder 4 and operatively connected to either end of the plug 9.

Figure 1:
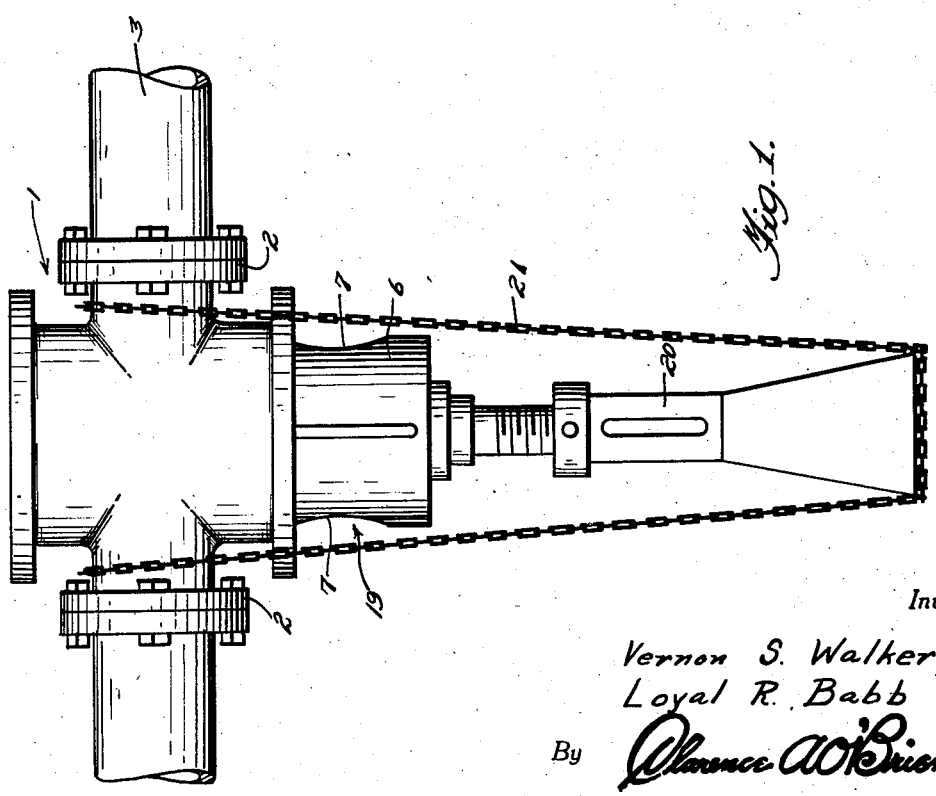
Figure 1 is a view in side elevation of a valve constructed in accordance with the present invention, showing a new unit being inserted.
Figure 3:
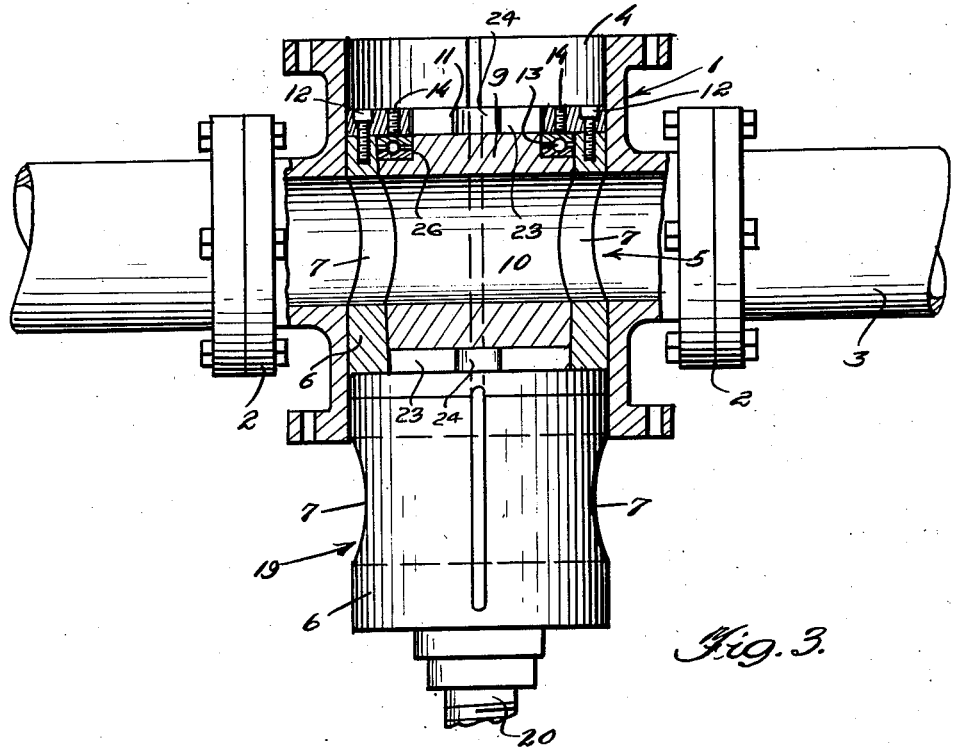
Figure 3 is a vertical sectional view, taken substantially on the line 3—3 of Figure 2.
Figure 4:
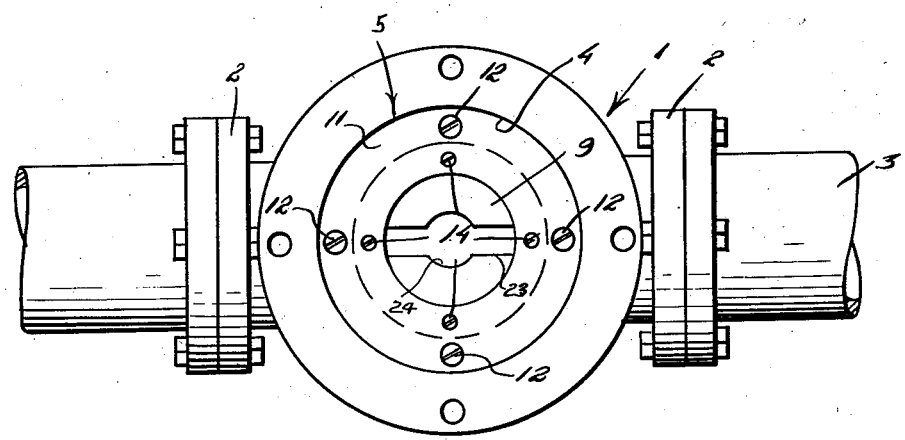
Figure 4 is a plan view.
Figure 5:
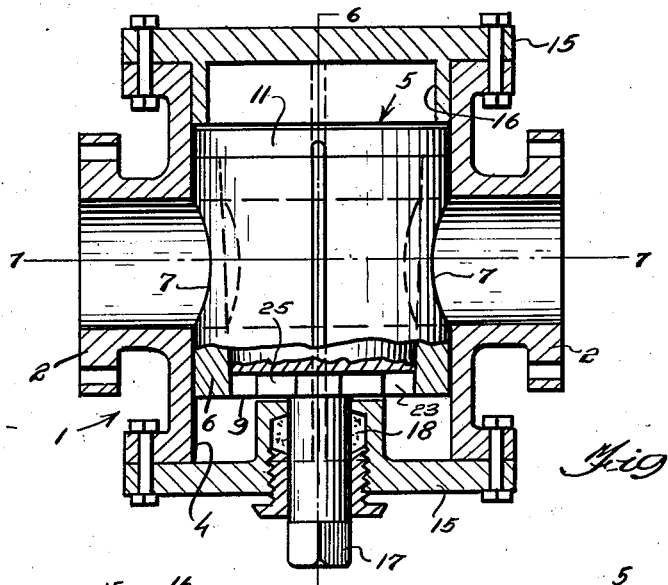
Figure 5 is a view in vertical section through a completely assembled valve.
Figure 6:
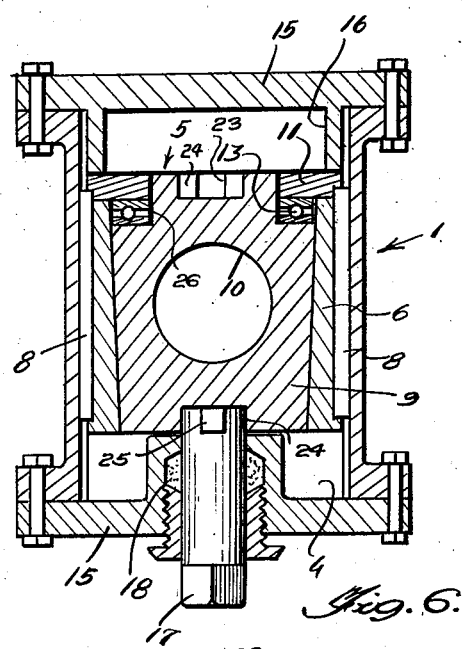
Figure 6 is a vertical sectional view, taken substantially on the line 6—6 of Figure 5.
Figure 7:
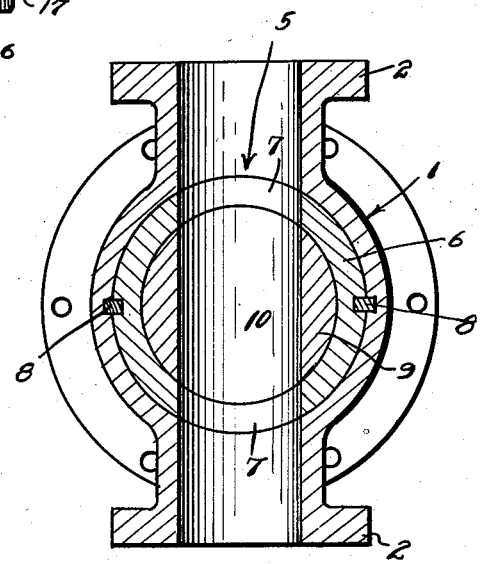
Figure 7 is a view in horizontal section, taken substantially on the line 7—7 of Figure 5.

When it is desired to replace the unit 5, the plates 15 are removed. As illustrated in Figures 1, 2 and 3 of the drawings, the new unit to be installed, as at 19, is slipped into one end portion of the cylinder 4. A screw jack 20 is then anchored by a chain 21 to the body 1 in alignment with the cylinder 4 and engaged with the new or replacement unit 19. Then, by operating the jack 20 the new or replacement unit 19 is forced into position in the cylinder 4 and the old unit 5 is pushed thereby out the opposite end of said cylinder. The plates 15 and the stem 17 are then replaced and the valve is ready for operation again. It will thus be seen that the operation of replacing any worn or damaged parts has been expeditiously accomplished without taking the pipe line out of service.

Figure 8:
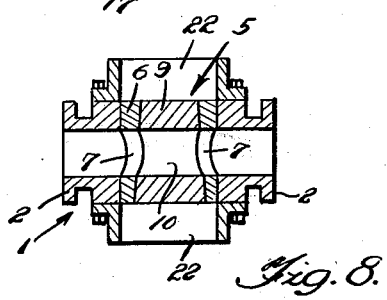
Figure 8 is a view in vertical longitudinal section through a slightly different form of valve.

In Figure 8 of the drawings, the body 1 is formed to provide a comparatively short cylinder to the ends of which flanged attachments 22 are bolted or otherwise suitably secured. The bores of the attachments 22 are the same as that of the comparatively short cylinder 4 to permit insertion and removal of the unit 5. In other respects this embodiment of the invention is substantially similar in construction and operation to that illustrated in Figures 1 to 7, inclusive of the drawings.

It may be well to here state that any other suitable method than that herein illustrated and described may be employed for accomplishing the simultaneous insertion and removal of the new and old units.

It is believed that the many advantages of a valve constructed in accordance with the present invention will be readily understood and although preferred embodiments of the device are as illustrated and described, it is to be understood that further modifications and changes in the details of construction may be resorted to which will fall within the scope of the invention as claimed.

What is claimed is:

A valve comprising a body including a cylinder having a diametrically opposite inlet and outlet, said cylinder being open at its ends, an internally tapered seat removably mounted in the cylinder and having diametrically opposite ports therein communicating with the inlet and outlet, a tapered plug rotatably mounted in the seat and having a diametrically extending passage therein for communication with the ports, removable end plates on the body closing the ends of the cylinder, an inwardly projecting flange on one end plate forming an abutment for one end of the plug, a packing gland on the other end plate projecting into the cylinder and forming an abutment for the other end of the plug, a manipulating stem for the plug journaled in the packing gland, said plug having a transverse groove in its end adjacent the stem, and a transverse key on the inner end of the stem engaged in the groove to provide a rotatable connection between the plug and stem, said key engaging the packing gland to prevent removal of the stem.

VERNON S. WALKER.
LOYAL R. BABB.